(12) United States Patent
Schuette

(10) Patent No.: US 6,625,521 B2
(45) Date of Patent: Sep. 23, 2003

(54) POWER STATION SYSTEM WITH SHARED STATIC STARTING DEVICE

(75) Inventor: Thomas Schuette, Turgi (CH)

(73) Assignee: Alstom (Schweiz) Ltd, Baden (CH)

( * ) Notice: Subject to any disclaimer, the term of this patent is extended or adjusted under 35 U.S.C. 154(b) by 37 days.

(21) Appl. No.: 09/790,904

(22) Filed: Feb. 23, 2001

(65) Prior Publication Data

US 2003/0057777 A1 Mar. 27, 2003

(30) Foreign Application Priority Data

Feb. 23, 2000 (DE) .......................................... 100 08 457

(51) Int. Cl.⁷ ................................................ H02P 9/10
(52) U.S. Cl. ...................................... 700/295; 700/297
(58) Field of Search ................................ 700/295, 296, 700/297

(56) References Cited

U.S. PATENT DOCUMENTS

| | | | | |
|---|---|---|---|---|
| 3,764,815 A | * | 10/1973 | Habock et al. ................ | 290/52 |
| 3,908,161 A | * | 9/1975 | Messenger .................... | 322/29 |
| 4,069,424 A | | 1/1978 | Burkett | |
| 6,333,622 B1 | * | 12/2001 | Fogarty et al. ................ | 322/90 |
| 6,339,316 B1 | * | 1/2002 | Eguchi et al. ................. | 322/59 |
| 2001/0054823 A1 | * | 12/2001 | Fogarty et al. ................ | 290/31 |

* cited by examiner

Primary Examiner—Leo Picard
Assistant Examiner—Michael D. Masinick
(74) Attorney, Agent, or Firm—Burns, Doane, Swecker & Mathis, L.L.P.

(57) ABSTRACT

A power station system (10') has a number of identical subunits, which each comprise a turbine or pump turbine and a generator/motor connected to the turbine or pump turbine, which generator/motor can be operated as a motor during acceleration of the subunit, with at least one static starting device (12, 13) being provided for acceleration of the subunits, which static starting device (12, 13) can selectively be connected to one of the subunits, and each subunit has its own associated controller (14a–c, 15a–c).

In a power station system such as this, the engineering and system complexity are reduced in that the controllers (14a–c, 15a–c) of the subunits are connected to the at least one static starting device (12, 13) such that the same information about the availability of the static starting device (12, 13) is available at all times in each of the controllers (14a–c, 15a–c).

12 Claims, 4 Drawing Sheets

POWER STATION SYSTEM WITH SHARED STATIC STARTING DEVICE

This application claims priority under 35 U.S.C. §§119 and/or 365 to Appln, N. 100 08 457.5 filed in Germany on Feb. 23, 2000; the entire content of which is hereby incorporated by reference.

FIELD OF THE INVENTION

The present invention relates to the field of power station technology. It relates in particular to a power station system having a number of identical subunits each including a turbine, and a generator/motor connected to the turbine, and a controller.

Such a power station is known, for example, from U.S. Pat. No. 3,764,815 (FIG. 6) or from U.S. Pat. No. 4,069,424.

DISCUSSION OF BACKGROUND

Static frequency converters (SFC) have been used in static starting devices (SSD) for several decades in pump storage power stations or gas turbine power stations, in order to accelerate the power station generators (gas turbine power stations or motors for pumps, turbines in pump storage power stations) from rest to a rotation speed at which they can continue to run on their own. During such a start, the synchronous generator is operated as a synchronous motor, with the electrical power required for the stator connections being provided at a variable frequency and voltage by the static frequency converter. In systems with a number of turbine/generator units, pump/turbine motor units (subunits), one static frequency converter is frequently used for a number of units in this case, in order to keep the system costs low. However, as a rule, this necessitates central control functions in order that the common static frequency converter can be used by the controllers for the connected subunits. In the past, such a central control function was always provided by a central controller which assigned the various digital and analog signals, and the signals transmitted on the bus, between the static frequency converter and the subunit to be accelerated. FIG. 1 shows an example of one such central controller. In this example, six subunits with the associated controllers 14$a$–$c$ (group 1) and 15$a$–$c$ (group 2) are provided in the power station 10. Each group has an associated static starting device 12 or 13, respectively, and can interchange data and/or signals with the individual controllers 14$a$–$c$ or 15$a$–$c$, respectively, in the group via appropriate connections. A connection between the two groups, which can be disconnected by means of a segment isolating switch 16, also allows one of the static starting devices 12, 13 to be connected to subunits in the respective other group as well, in an emergency. A central controller 11 determines which of the subunits or controllers 14$a$–$c$ and 15$a$–$c$ will be used for a starting process by one of the static starting devices 12, 13, and this central controller 11 interchanges information not only with the controllers 14$a$–$c$, 15$a$–$c$ of the subunits but also with the static starting devices 12, 13.

A disadvantage of this known solution is that the additional central control function must be designed specifically for each specific system configuration. This relates, for example, to the number of static starting devices (primary and standby devices) per number of subunits which use the starting device normally and in an emergency when one of the starting devices has failed. Furthermore, during construction of the power station system, the central control needs to be continually modified to the latest standard in order to match the control logic to the system configuration existing at that time and to the availability of starting devices and subunits. This matching process has been found to be costly and time-consuming.

SUMMARY OF THE INVENTION

The object of the invention is thus to design the starting devices for a power station system such that the stated disadvantages are overcome and such that, in particular, the engineering and system costs can be considerably reduced by saving a central control function.

The essence of the invention is to use a decentralized allocation logic structure in each controller of a subunit in the same way, and directly to produce and to store information when the respective starting device is currently being used by a subunit and is thus not available for further use by another subunit, or is busy. The controllers of the other subunits then immediately know that the static starting device is currently unavailable for starting, and they can react accordingly. Since each subunit is always informed about the current availability of the associated starting device, there is no need for a central controller, or the complexity associated with it.

According to one preferred refinement of the invention, a busy signal ("flag") is used to describe the availability of the static starting device and is set when one of the controllers initiates a start using the associated static starting device and is reset when none of the controllers initiates a start and the associated static starting device is freely available, with the busy signal being derived in particular from a function or unit in the power station system which allows reliable indication of the busy status of the static starting device at that time.

This can be done either by the static starting device producing the busy signal itself, or by the busy signal being produced by a component or a unit which is associated with the respective subunit and changes its status when a starting process is initiated. In the latter case, when a starting isolating switch is in each case provided for connecting the subunit and static starting device during a starting process and, as a high-voltage switch, connects the static starting device to the generator bus of the subunit, the busy signal is produced or derived from the starting isolating switches.

A further preferred refinement of the invention is characterized in that the subunits and their controllers are combined to form groups, and in that each group has its own dedicated static starting device for normal operation, in that each of the controllers in a group is connected to the associated static starting device via a first channel, in that each of the controllers in a group is connected to the static starting device of another group via a second channel and in that the connection via the second channels is activated only when the dedicated static starting device in the group is not available in an emergency.

The connection between the controllers and the associated static starting devices can be produced, in particular, by permanent wiring. However, it is also feasible for the connection between the controllers and the associated static starting devices to be produced via a data or signal bus.

BRIEF DESCRIPTION OF THE FIGURES

The invention will be explained in more detail in the following text with reference to exemplary embodiments in conjunction with the drawing, in which.

WAYS OF IMPLEMENTING THE INVENTION

Figure 1:
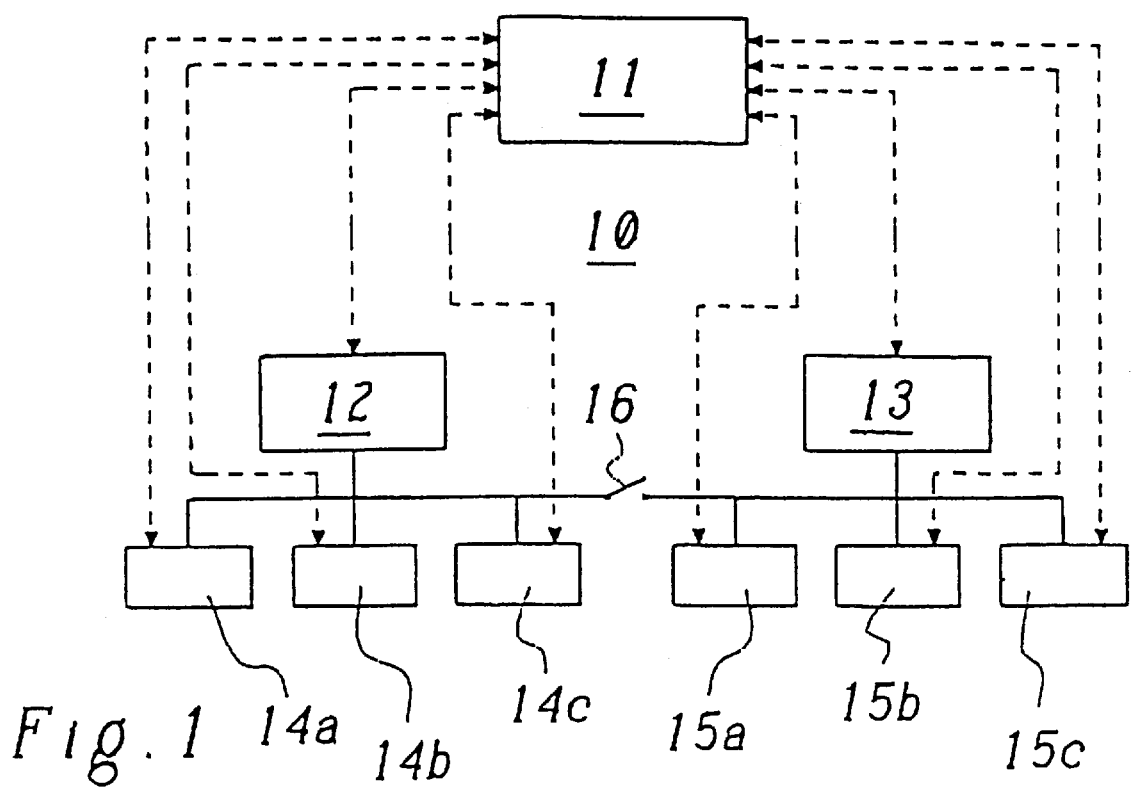
FIG. 1 shows a detail from the simplified circuit diagram of a conventional power station system having a number of subunits which produce power and comprise a turbine or pumps and a generator/motor, or motors for pump turbines, and static starting devices, with the interaction of the starting devices and the local controllers of the subunits being controlled by a central controller.
Figure 2:
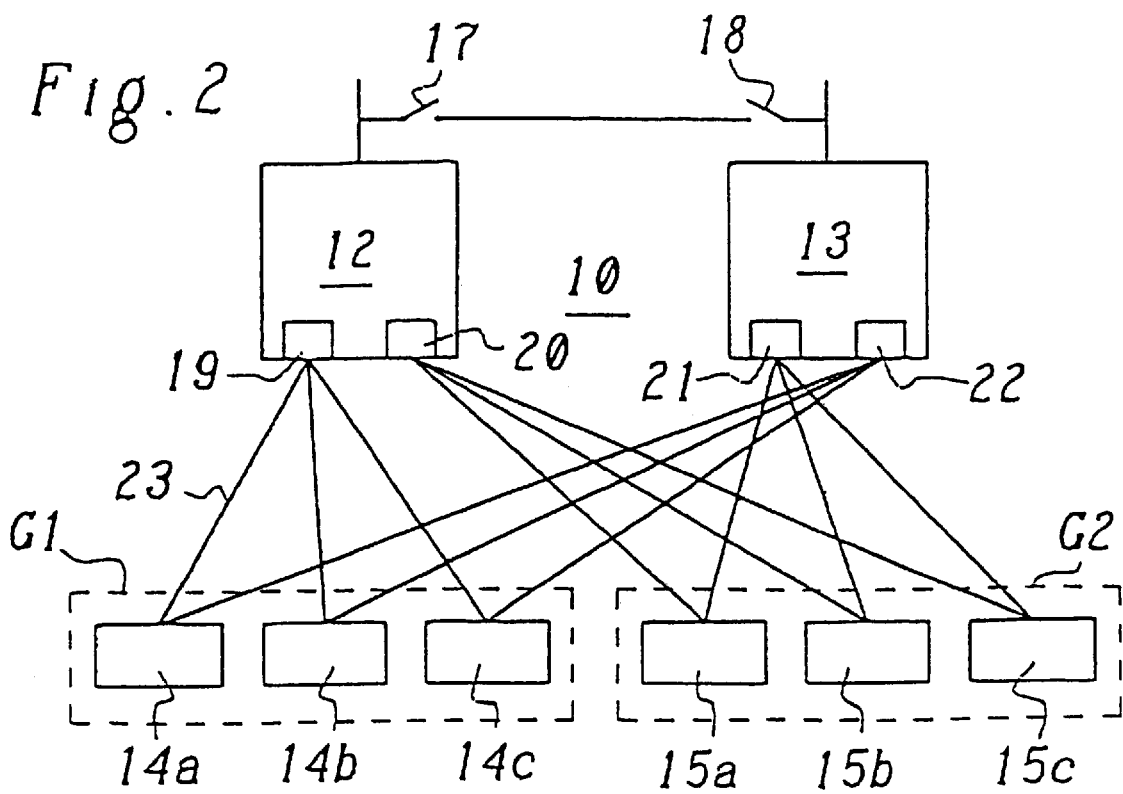
FIG. 2 shows a detail, comparable to that in FIG. 1, from the circuit diagram of a power station system based on a preferred exemplary embodiment of the invention, with a decentralized allocation logic structure and direct data interchange between the controllers and the starting devices via permanent wiring.

The following explanation of the invention is based on a configuration as shown in FIG. 2. In the system layout of a power station system 10', a detail of which is illustrated there, a total of six subunits (comprising a turbine and a generator/motor or pump turbine with motor) which are arranged in two groups, G1 and G2, together with their controllers 14a–c and 15a–c are provided, as well as two static starting devices 12 and 13. The output sides of the static starting devices 12 and 13 are connected to the generator bus via the starting isolating switch. In an emergency, the output-side buses can be connected to one another via associated segment isolating switches 17, 18. For normal operation, each group G1, G2 of subunits has an associated one of the static starting devices 12 or 13, respectively. In FIG. 2, the group G1 is associated with the static starting device 12, and the group G2 with the static starting device 13. Both static starting devices 12, 13 are equipped with two channels 19, 20, and 21, 22 respectively. The static starting devices 12, 13 are (normally) each connected via the first channel 19 or 21, respectively, to the individual subunits and their controllers 14a–c and 15a–c, respectively, in the associated group G1, G2. The static starting devices 12, 13 are each (normally) connected via the second channel 20 or 22, respectively, to the individual subunits and their controllers 15a–c and 14a–c, respectively, in the respective other group G2 or G1, respectively. In the illustrated case, the connection is produced by discrete signals on permanent wiring (connecting lines 23). According to the invention, there is no need for any central controller for the data and signal interchange between the starting devices and the controllers, as shown in FIG. 1.

This decentralized allocation logic structure allows access rights to be allocated to a static starting device for each of the connected controllers within the associated group based on the principle of "first come first served". Since the central controller and central intelligence have been dispensed with completely, each of the controllers must itself be able to decide whether it can use the common static starting device, or whether the starting device is currently being used by another subunit in the same group, and is thus busy. For this purpose, each of the controllers 14a–c and 15a–c receives a specific signal (busy signal) which is produced whenever any controller in the same group has initiated a start by access to the associated static starting device 12 or 13, respectively. This busy signal can be described as a "flag". The "flag" can be derived from any function or unit in the power station system 10' which allows reliable indication of the busy status of the starting device at that time. For example, the "flag" can be produced either by the static starting device itself for example in the form of a binary signal or by a component or a unit in the power station system which is associated with the respective subunit and whose status changes as soon as the starting process has been initiated.

In the present exemplary embodiment, the busy signal is derived from a starting isolating switch which, as a high-voltage switch for starting, connects the static starting device to the generator bus of the respective subunit. (This signal (a binary signal in the present case) is made available to each controller within one of the group and, in addition, to those controllers in the other group which can be allocated to the same static starting device in an emergency. Each of the controllers 14a–c and 15a–c is programmed with the decentralized allocation logic structure, which represents an exact copy of the system configuration.

Figure 3:
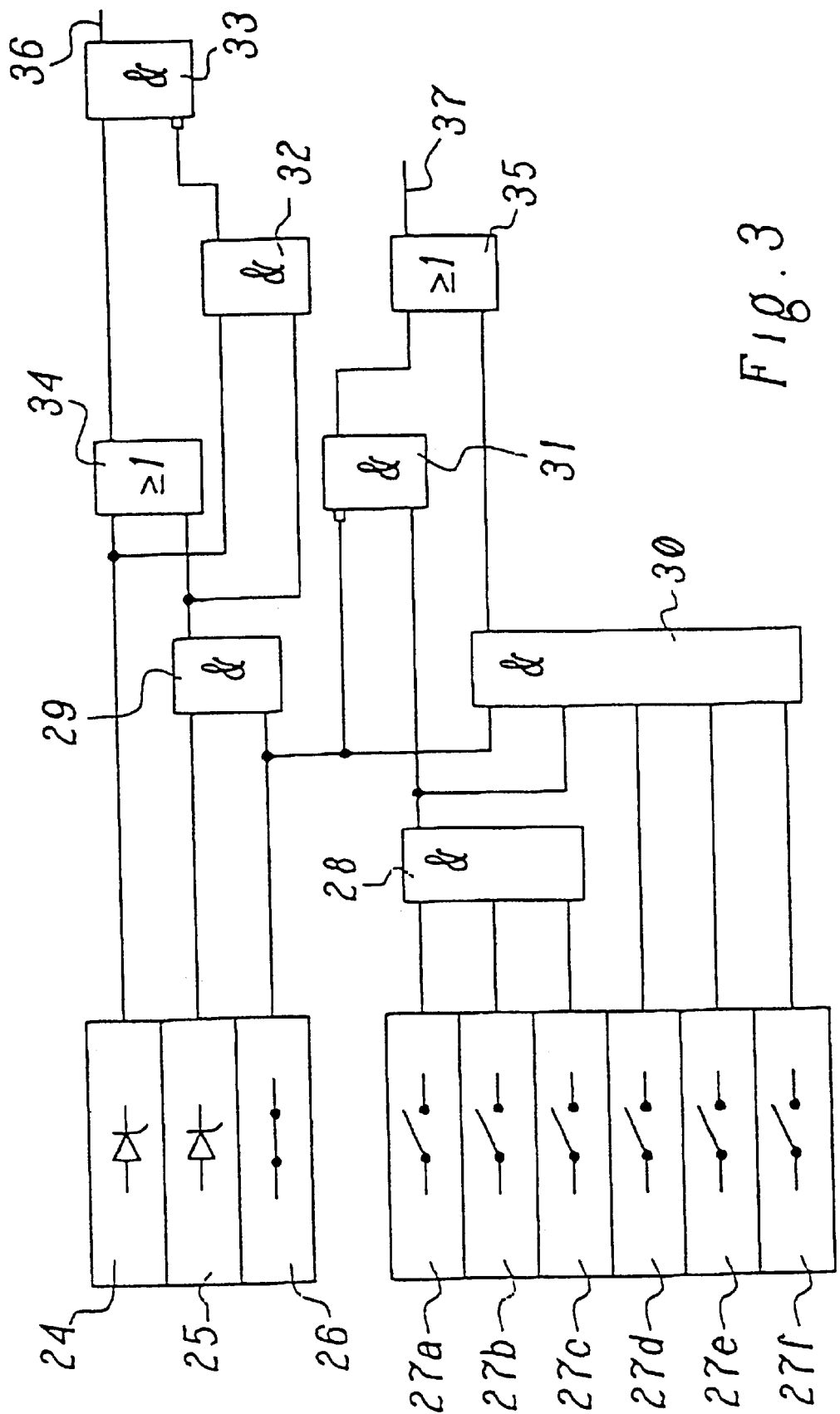
FIG. 3 shows an exemplary embodiment of a logic structure according to the invention, by means of which a busy signal for the starting devices can be derived or produced.

FIG. 3 shows one example of such an allocation logic structure for a controller in the first group G1: this is based on the two static starting devices 24 and 25 (identified by a thyristor symbol) for the first and second group G1 or G2, respectively, the segment isolating switch 26 (between the starting devices) and the starting isolating switches 27a–f of the individual controllers 14a–c and 15a–c for the subunits. At a first flag output 36, the logic structure provides a "flag" produced by the starting devices and, at a second flag output 37, it provides a "flag" produced by the switching connections. The logic operations carried out on the binary input signals are performed by various AND gates 28–33 and OR gates 34, 35. The gates 32, 33 and 34 together form an exclusive OR gate which sets a "flag" either when the starting device 24 in the first group G1 is producing a busy signal (normal situation) or when the starting device 25 in the second group G2 is producing a busy signal and the segment isolating switch 26 is closed at the same time (emergency).

The "flag" of the second flag output 37 is set either when all the starting isolating switches 27a–c in the first group and the segment isolating switch 26 are open, or when the segment isolating switch 26 is closed and the starting isolating switches 27a–f in both groups are open. As soon as one of the switches is closed in the course of a starting process, the "flag" at the flag output 37 is reset, and produces a busy signal.

To allow the engineering costs for special projects to be reduced or entirely avoided, the individual controllers 14a–c, 15a–c are designed for the maximum configuration (that is to say for the maximum number of controllers per static starting device). Matching to different configurations can then be achieved easily by inserting wire links across the binary inputs of those units which do not, or do not yet, exist.

The use of the novel decentralized allocation logic structure results in each controller of a subunit having an exact copy of the status of the system at that time, with respect to the use of the static starting devices. Before a starting device can be used for a start, the corresponding controller must find out whether the starting device is not currently being used for a starting process by another controller or subunit in the same group. If the starting device is available for a start, the controller initiates the start and blocks use of the starting device by other controllers in the group. This is done by immediately setting the "flag" (in the described situation by closing the starting isolating switch). Owing to the decentralized allocation logic structure, each controller in the same group then has a copy of precisely the same "flag" settings, and thus of the current busy status of the starting device.

As can be seen from FIG. 2, each controller 14a–c or 15a–c, respectively for a subunit has parallel access to the associated static starting device 12 or 13, respectively. The first channel 19 or 21, respectively, is in this case reserved for the controllers for the respective associated group G1 or G2. The second channel 20 or 22, respectively, is reserved exclusively for emergencies and is activated only in emergencies when the static starting device in the other group is not available. In other situations, incoming signals are ignored, and output signals on the second channels 20 and 22, respectively, are blocked (in the case of signals on permanent wiring) by open relay contacts. If signals on permanent wiring are used, all the signals within the same electrical circuit must be electrically conductively isolated. Connection to the common signal bus and data interchange can be allowed only once a controller has received usage rights for a starting device. These usage rights are allocated exclusively by the described decentralized allocation logic structure of the invention.

Figure 4:
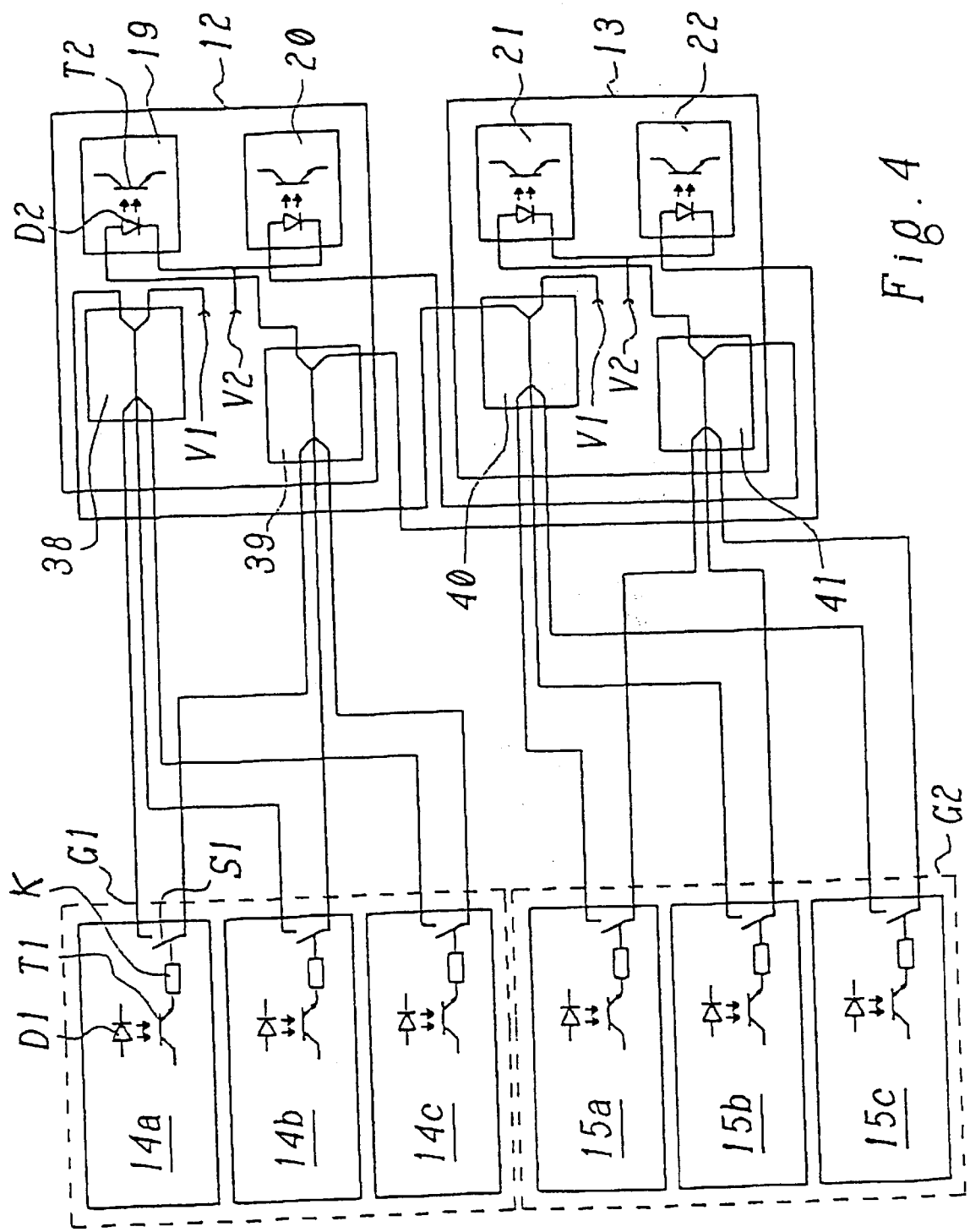
FIG. 4 shows a detailed exemplary embodiment for signal interchange via permanent wiring between controllers and starting devices according to FIG. 2, in the transmission direction from the controllers to the starting devices.
Figure 5:
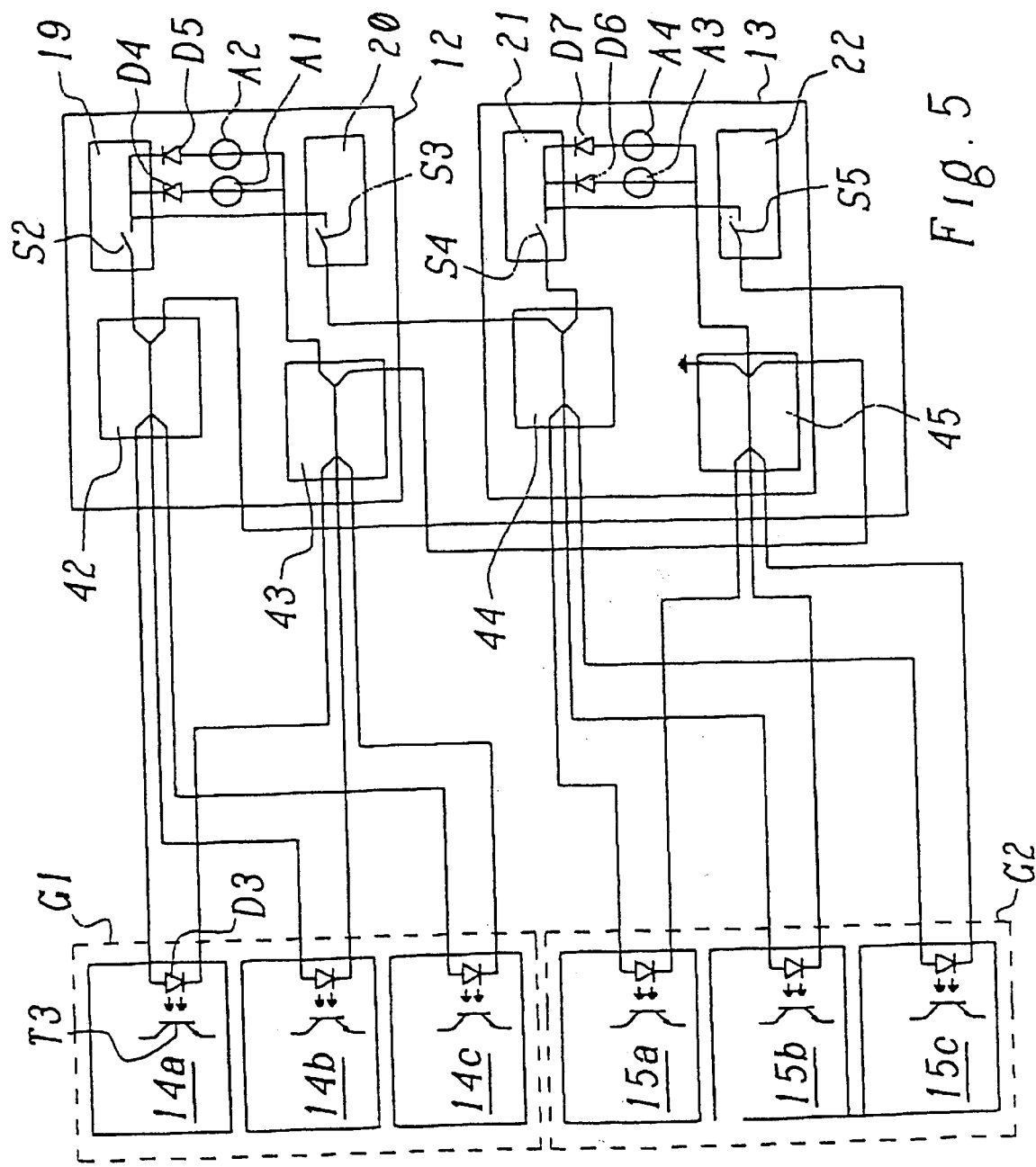
FIG. 5 shows the transmission, corresponding to that in FIG. 4, in the opposite direction.

Binary signals between the controllers 14a–c and 15a–c and the static starting devices 12 and 13 are preferably allocated in the form illustrated in FIGS. 4 and 5. In FIG. 4, the outputs of the controllers 14a–c and 15a–c are connected in the illustrated manner via two respective connecting points 38, 39 and 40, 41 to the inputs of the two respective channels 19, 20 and 21, 22 of the two starting devices 12 and 13. The (decoupled) outputs of the controllers (for example of the Egatrotype from the applicant) are respectively symbolized by an optocoupler (D1 and T1), a relay coil (K) and a relay contact (S1), and the (decoupled) inputs of the channels 19–22 are respectively symbolized by an optocoupler (D2 and T2). The optocoupler inputs (light-emitting diodes D2) located in the established circuits are supplied with a DC voltage of 24V through appropriate voltage inputs V1, V2.

In FIG. 5, the inputs of the controllers 14a–c and 15a–c are connected in the illustrated manner via two respective connecting points 42, 43 and 44, 45 to the outputs of the two respective channels 19, 20 and 21, 22 of the two starting devices 12 and 13. The (decoupled) inputs of the controllers are respectively symbolized by an optocoupler (light-emitting diode D3 and a transistor T3), and the outputs of the channels 19–22 are respectively symbolized by a relay contact S2–S5. The light-emitting diodes D3 located in the circuits are supplied with a DC voltage of 24V via diodes D4–D7 from corresponding voltage sources A1–A4. Furthermore, one connecting point 45 is grounded.

If signals transmitted via a bus are used instead of the binary signals, the controllers and the starting devices are associated in a manner analogous to that in FIGS. 4 and 5.

LIST OF REFERENCE SYMBOLS

| | |
|---|---|
| 10, 10' | Power station system |
| 11 | Central controller |
| 12, 13 | Static starting device (SSD) |
| 14a–c | Controller (subunit) |
| 15a–c | Controller (subunit) |
| 16, . . . , 18 | Segment isolating switch |
| 19, . . . , 22 | Channel |
| 23 | Connecting line |
| 24, 25 | Static frequency converter (SFC) |
| 26 | Segment isolating switch |
| 27a–f | Starting isolating switch |
| 28, . . . , 33 | AND gate |
| 34, 35 | OR gate |
| 36, 37 | Flag output |
| 38, . . . , 45 | Connecting point |
| A1, . . . , A4 | Power source |
| D1, . . . , D3 | Light-emitting diode (optocoupler) |
| D4, . . . , D7 | Diode |
| G1, G2 | Group (of subunits) |
| N | Relay coil |
| S1, . . . , S5 | Relay contact |
| V1, V2 | Voltage input |
| T1, T2 | Transistor |

What is claimed is:

1. A power station system comprising:

a plurality of identical subunits, each subunit comprising a turbine, and a generator/motor connected to the turbine, and a controller; and at least one static starting device;

wherein the at least one static starting device is selectively connectable to one of the subunits, and wherein the controllers of the subunits are connected to the at least one static starting device such that the same information about availability of the at least one static starting device is available at all times in each of the controllers.

2. The power station system as claimed in claim 1, wherein for each of the at least one static starting device:

a signal describes the availability of the at least one static starting device;

the signal is set to indicate busy when one of the controllers initiates a start using the at least one static starting device; and the signal is reset to indicate not busy when none of the controllers initiates a start and the at least one static starting device is freely available.

3. The power station system as claimed in claim 2, wherein the signal is derived from a function or unit in the power station system which allows reliable indication of the busy status of the at least one static starting device at that time.

4. The power station system as claimed in claim 3, wherein the signal is produced by the at least one static starting device.

5. The power station system as claimed in claim 3, wherein the signal is produced by a component or a unit which is associated with the respective subunit and whose status changes when a starting process is initiated.

6. The power station system as claimed in claim 5, comprising:

for each subunit, a starting isolating switch connected between a generator bus of the subunit and the at least one static starting device wherein the signal is produced or derived from the starting isolating switches.

7. The power station system as claimed in claim 1, wherein the subunits and their controllers are combined to form groups, and each group has its own dedicated static starting device for normal operation.

8. The power station system as claimed in claim 7, wherein each of the controllers in a group is connected to the associated static starting device via a first channel, each of the controllers in a group is connected to the static starting device of another group via a second channel, and the connection via the second channels is activated only when the dedicated static starting device in the group is not available in an emergency.

9. The power station system as claimed in claim 1, wherein the connections between the controllers and the associated static starting devices are produced by permanent wiring.

10. The power station system as claimed in claim 1, wherein the connections between the controllers and the associated static starting devices are produced via a data or signal bus.

11. The power station system as claimed in claim 1, wherein the generator/motor operates as a motor during acceleration of the subunit by the at least one static starting device.

12. The power station system as claimed in claim 6, wherein the starting isolating switch comprises a high-voltage switch.

* * * * *